US007774718B2

(12) United States Patent
Finke-Anlauff et al.

(10) Patent No.: US 7,774,718 B2
(45) Date of Patent: Aug. 10, 2010

(54) TIME HANDLE IN A MEDIA DIARY APPLICATION FOR ACCESSING MEDIA FILES

(75) Inventors: Andrea Finke-Anlauff, Braunschweig (DE); Laura Huhtela-Bremer, Espoo (FI); Vesa Metsätähti, Helsinki (FI); Tomi Hakari, Sipoo (FI); Tommi Bäckgren, Helsinki (FI); Olof Schybergson, London (GB)

(73) Assignee: Nokia Corporation, Espoo (FI)

( * ) Notice: Subject to any disclaimer, the term of this patent is extended or adjusted under 35 U.S.C. 154(b) by 1250 days.

(21) Appl. No.: 10/738,006

(22) Filed: Dec. 17, 2003

(65) Prior Publication Data
US 2005/0138066 A1    Jun. 23, 2005

(51) Int. Cl.
*G06F 3/048* (2006.01)
(52) U.S. Cl. .................. 715/833; 715/784; 715/785; 715/786
(58) Field of Classification Search ......... 715/784–787, 715/833
See application file for complete search history.

(56) References Cited

U.S. PATENT DOCUMENTS

| 5,241,671 | A | | 8/1993 | Reed et al. ............... 707/104.1 |
| 5,247,611 | A | | 9/1993 | Norden-Paul et al. ....... 395/161 |
| 5,323,314 | A | | 6/1994 | Baber et al. |
| 5,526,480 | A | * | 6/1996 | Gibson .................... 715/500.1 |
| 5,557,728 | A | | 9/1996 | Garrett et al. ............... 715/801 |
| 5,592,195 | A | | 1/1997 | Misono et al. |
| 5,615,347 | A | | 3/1997 | Davis et al. |
| 5,633,678 | A | | 5/1997 | Parulski et al. ........... 348/231.5 |
| 5,732,184 | A | | 3/1998 | Chao et al. |
| 5,745,110 | A | | 4/1998 | Ertemalp .................... 715/764 |
| 5,781,899 | A | | 7/1998 | Hirata ........................... 707/6 |
| 5,822,123 | A | | 10/1998 | Davis et al. |

(Continued)

FOREIGN PATENT DOCUMENTS

CN    1252573 A    5/2000

(Continued)

OTHER PUBLICATIONS

B. Schneiderman; *Designing the User Interface: Strategies for Effective Human-Computer Interaction*; 1992; pp. 510-549; Chapter 15; XP 002210867.

(Continued)

*Primary Examiner*—Ting Lee
*Assistant Examiner*—Ashraf Zahr
(74) *Attorney, Agent, or Firm*—Alston & Bird LLP (57) ABSTRACT

A media management application implemented in a digital device that incorporates a media handle. The media handle is moveable within a display to provide the user of the application with viewable access to media file representations or calendar events. The media handle may be displayed in conjunction with a media view, a calendar view and/or a time bar, such that the media handle provides access to desired portions of the media view, the calendar view or the time bar. The media handle of the present invention provides the device user with a highly efficient means of locating time periods and the media files associated with the time periods. In addition, the media handle provides ergonomic benefit to the user, in that, user inputs to the device are limited and the user inputs that are required are user-friendly.

41 Claims, 7 Drawing Sheets

U.S. PATENT DOCUMENTS

| | | | |
|---|---|---|---|
| 5,864,330 A | 1/1999 | Haynes | |
| 5,872,566 A | 2/1999 | Bates et al. | 715/786 |
| 5,898,431 A | 4/1999 | Webster et al. | 345/331 |
| 6,023,241 A | 2/2000 | Clapper | 342/357.13 |
| 6,023,715 A | 2/2000 | Burkes et al. | |
| 6,034,683 A | 3/2000 | Mansour et al. | |
| 6,064,975 A * | 5/2000 | Moon et al. | 705/8 |
| 6,085,205 A | 7/2000 | Peairs et al. | 707/530 |
| 6,167,469 A | 12/2000 | Safai et al. | 710/62 |
| 6,204,846 B1* | 3/2001 | Little et al. | 715/784 |
| 6,216,131 B1 | 4/2001 | Liu et al. | 7/102 |
| 6,219,052 B1 | 4/2001 | Gould | 345/341 |
| 6,236,387 B1 | 5/2001 | Imada | |
| 6,256,162 B1 | 7/2001 | Matsumoto et al. | 360/72.2 |
| 6,282,362 B1 | 8/2001 | Murphy et al. | 386/46 |
| 6,301,586 B1 | 10/2001 | Yang et al. | 707/104 |
| 6,304,881 B1 | 10/2001 | Halim et al. | 707/201 |
| 6,330,568 B1 | 12/2001 | Boothby et al. | 707/201 |
| 6,337,694 B1* | 1/2002 | Becker et al. | 345/684 |
| 6,340,978 B1 | 1/2002 | Mindrum | 345/764 |
| 6,345,274 B1 | 2/2002 | Zhu et al. | 707/5 |
| 6,345,288 B1 | 2/2002 | Reed et al. | 709/201 |
| 6,373,507 B1 | 4/2002 | Camara et al. | 345/825 |
| 6,380,953 B1 | 4/2002 | Mizuo | 345/764 |
| 6,380,959 B1 | 4/2002 | Wang et al. | 345/853 |
| 6,384,845 B1* | 5/2002 | Takaike | 715/786 |
| 6,404,937 B1 | 6/2002 | Agata et al. | 382/305 |
| 6,405,218 B1 | 6/2002 | Boothby | 707/201 |
| 6,408,301 B1 | 6/2002 | Patton et al. | 707/102 |
| 6,411,724 B1 | 6/2002 | Vaithilingam et al. | 382/100 |
| 6,433,798 B1* | 8/2002 | Smith et al. | 715/764 |
| 6,462,752 B1* | 10/2002 | Ma et al. | 345/684 |
| 6,480,840 B2 | 11/2002 | Zhu et al. | 707/3 |
| 6,486,896 B1* | 11/2002 | Ubillos | 715/784 |
| 6,496,842 B1 | 12/2002 | Lyness | |
| 6,502,100 B1 | 12/2002 | Meyers | 707/101 |
| 6,512,530 B1 | 1/2003 | Rzepkowski et al. | |
| 6,515,687 B1 | 2/2003 | Wynn et al. | |
| 6,532,480 B1 | 3/2003 | Boothby | 707/201 |
| 6,535,636 B1 | 3/2003 | Savakis et al. | 382/173 |
| 6,546,399 B1 | 4/2003 | Reed et al. | 707/104.1 |
| 6,590,585 B1 | 7/2003 | Suzuki et al. | |
| 6,600,510 B1 | 7/2003 | Parulski et al. | 348/211.2 |
| 6,621,508 B1 | 9/2003 | Shiraishi et al. | |
| 6,629,100 B2 | 9/2003 | Morris et al. | 707/10 |
| 6,629,104 B1 | 9/2003 | Parulski et al. | 707/102 |
| 6,677,965 B1* | 1/2004 | Ullmann et al. | 715/786 |
| 6,809,724 B1 | 10/2004 | Shiraishi et al. | |
| 6,832,221 B2 | 12/2004 | Takahashi | |
| 6,922,816 B1* | 7/2005 | Amin et al. | 715/833 |
| 6,996,782 B2* | 2/2006 | Parker et al. | 715/764 |
| 7,071,919 B2 | 7/2006 | Hinckley et al. | |
| 7,117,450 B1 | 10/2006 | Chaudhri | |
| 7,165,227 B2* | 1/2007 | Ubillos | 715/784 |
| 2001/0045964 A1 | 11/2001 | Camara et al. | 345/810 |
| 2002/0054067 A1 | 5/2002 | Ludtke et al. | 345/716 |
| 2002/0054157 A1 | 5/2002 | Hayashi et al. | |
| 2002/0059256 A1 | 5/2002 | Halim et al. | 707/10 |
| 2002/0063732 A1 | 5/2002 | Mansikkaniemi et al. | 345/733 |
| 2002/0075322 A1 | 6/2002 | Rosenzweig et al. | 715/835 |
| 2002/0075325 A1 | 6/2002 | Combs et al. | 715/848 |
| 2002/0075330 A1 | 6/2002 | Rosenzweig et al. | 715/854 |
| 2002/0076217 A1 | 6/2002 | Rodriguez et al. | 396/72 |
| 2002/0078070 A1 | 6/2002 | Eshelman et al. | 707/200 |
| 2002/0087546 A1 | 7/2002 | Slater et al. | 707/10 |
| 2002/0087601 A1 | 7/2002 | Anderson et al. | 715/515 |
| 2002/0113803 A1 | 8/2002 | Samra et al. | |
| 2002/0122067 A1 | 9/2002 | Geigel et al. | 715/788 |
| 2002/0122071 A1 | 9/2002 | Camara et al. | 715/810 |
| 2002/0124004 A1 | 9/2002 | Reed et al. | 707/100 |
| 2002/0126158 A1 | 9/2002 | Camara et al. | 715/810 |
| 2002/0140820 A1 | 10/2002 | Borden | |
| 2002/0147744 A1 | 10/2002 | Smith et al. | |
| 2002/0186252 A1* | 12/2002 | Himmel et al. | 345/787 |
| 2002/0188602 A1 | 12/2002 | Stubler et al. | 707/3 |
| 2003/0009469 A1 | 1/2003 | Platt et al. | 707/100 |
| 2003/0009493 A1 | 1/2003 | Parker et al. | 707/500.1 |
| 2003/0033296 A1* | 2/2003 | Rothmuller et al. | 707/3 |
| 2003/0051207 A1 | 3/2003 | Kobayashi et al. | 715/500 |
| 2003/0059112 A1 | 3/2003 | Loui et al. | 382/176 |
| 2003/0081145 A1 | 5/2003 | Seaman et al. | 348/460 |
| 2003/0095143 A1 | 5/2003 | Lauris | |
| 2003/0097361 A1 | 5/2003 | Huang et al. | |
| 2003/0107603 A1* | 6/2003 | Clapper | 345/784 |
| 2003/0110503 A1 | 6/2003 | Perkes | 725/86 |
| 2003/0115219 A1 | 6/2003 | Chadwick | 707/200 |
| 2003/0117498 A1 | 6/2003 | Cole et al. | 348/207.99 |
| 2003/0123737 A1 | 7/2003 | Mojsilovic et al. | 382/224 |
| 2003/0126212 A1 | 7/2003 | Morris et al. | 709/205 |
| 2003/0126603 A1 | 7/2003 | Kim et al. | 725/38 |
| 2003/0128227 A1 | 7/2003 | Crow et al. | 345/700 |
| 2003/0128389 A1 | 7/2003 | Matraszek et al. | 358/1.18 |
| 2003/0133017 A1 | 7/2003 | Mauro | 348/207.99 |
| 2003/0140034 A1 | 7/2003 | Probst et al. | 707/3 |
| 2003/0146938 A1* | 8/2003 | Geiger | 345/784 |
| 2003/0154178 A1 | 8/2003 | McIntyre et al. | 707/1 |
| 2003/0156138 A1 | 8/2003 | Vronay et al. | |
| 2003/0156202 A1 | 8/2003 | van Zee | 348/222.1 |
| 2003/0161499 A1 | 8/2003 | Svendsen et al. | 382/102 |
| 2003/0163474 A1 | 8/2003 | Herz | 707/100 |
| 2003/0174893 A1 | 9/2003 | Sun et al. | 382/232 |
| 2003/0182170 A1 | 9/2003 | Meunitz | 705/9 |
| 2003/0187820 A1 | 10/2003 | Kohut et al. | 707/1 |
| 2003/0193582 A1 | 10/2003 | Kinjo | 348/231.99 |
| 2003/0195883 A1 | 10/2003 | Mojsilovic et al. | 707/6 |
| 2003/0212993 A1 | 11/2003 | Obrador | 725/9 |
| 2003/0217118 A1 | 11/2003 | Kobayashi et al. | 709/218 |
| 2003/0220894 A1 | 11/2003 | Russon | 707/1 |
| 2004/0109025 A1 | 6/2004 | Hullot et al. | |
| 2004/0125150 A1 | 7/2004 | Adcock et al. | |
| 2004/0145602 A1 | 7/2004 | Sun et al. | 345/720 |
| 2004/0153445 A1 | 8/2004 | Horvitz et al. | 707/3 |
| 2005/0044066 A1 | 2/2005 | Hooper et al. | |
| 2005/0091596 A1* | 4/2005 | Anthony et al. | 715/712 |
| 2005/0105374 A1 | 5/2005 | Finke-Anlauff et al. | |
| 2005/0108233 A1 | 5/2005 | Metsatahti et al. | |
| 2005/0108234 A1 | 5/2005 | Oksanen et al. | |
| 2005/0108253 A1 | 5/2005 | Metsatahti et al. | |
| 2005/0108643 A1 | 5/2005 | Schybergson et al. | |
| 2005/0108644 A1 | 5/2005 | Finke-Anlauff et al. | |
| 2005/0187943 A1 | 8/2005 | Finke-Anlauff et al. | |
| 2005/0246619 A1 | 11/2005 | Krause | |
| 2006/0248475 A1* | 11/2006 | Abrahamsson | 715/835 |
| 2007/0300260 A1 | 12/2007 | Holm et al. | |

FOREIGN PATENT DOCUMENTS

| | | |
|---|---|---|
| EP | 0 542 662 A1 | 10/1992 |
| EP | 0 542 662 A1 | 5/1993 |
| EP | 1 004 967 A1 | 5/2000 |
| EP | 1 035 481 A | 9/2000 |
| EP | 1051034 A1 | 11/2000 |
| EP | 1 087 303 A | 3/2001 |
| EP | 1 182 585 A2 | 2/2002 |
| EP | 1 351 167 A2 | 10/2003 |
| GB | 2 379 116 A | 2/2003 |
| GB | 2 382 488 A | 5/2006 |
| JP | 7-21006 | 1/1995 |
| JP | 07-261661 A | 10/1995 |
| JP | 08-087234 A | 4/1996 |
| JP | 08-331654 A | 12/1996 |
| JP | 09-130861 A | 5/1997 |
| JP | 10-124246 | 5/1998 |
| JP | 2001-175691 A | 6/2001 |

| | | |
|---|---|---|
| JP | 2001-202170 A | 7/2001 |
| JP | 2001-202340 | 7/2001 |
| JP | 2001-306599 A | 11/2001 |
| JP | 2001-312516 A | 11/2001 |
| JP | 2002-073679 | 3/2002 |
| JP | 2002-116040 A | 4/2002 |
| JP | 2003-87624 A | 3/2003 |
| JP | 2003-209824 A | 7/2003 |
| JP | 2003-303211 A | 10/2003 |
| KR | 1993-10753 | 6/1993 |
| WO | WO 96/31819 A2 | 10/1996 |
| WO | WO 9937075 A1 | 7/1999 |
| WO | WO 00/04726 | 1/2000 |
| WO | WO 01/28227 A1 | 4/2001 |
| WO | WO 02/27545 A2 | 4/2002 |
| WO | WO 02/057959 A2 | 7/2002 |
| WO | WO 02/086735 A1 | 10/2002 |
| WO | WO 03/083715 A1 | 10/2003 |

OTHER PUBLICATIONS

K. Priyantha Hewagamage, Masahito Hirakawa; *Augmented Album: Situation-dependent System for a Personal Digital Video/Image Collection*; 2000; pp. 323-326; 0-7803-6536-4/00; IEEE.

Masahito Hirakawa, Priyantha Hewagamage, Tado Ichikawa; *Situation-dependent Browser to Explore the Information Space*.

Girgensohn et al., "Simplifying the Management of Large Photo Collections" *Proceedings of the IFIP TC13 International Conference on Human-Computer Interaction Interact'2003*, Sep. 1, 2003, pp. 196-203.

Ringel et al, "Milestones in Time: The Value of Landmarks in Retrieving Information from Personal Stores", *Proceedings of the IFIP TC13 International Conference on Human-Computer Interaction Interact'2003*, Sep. 1, 2003, pp. 184-191.

Koike et al., "TimeSlider: an interface to specify time point", *Proceedings of the ACM Symposium on User Interface Software and Technology, 10th Annual Symposium. UIST '97*, Oct. 17, 1997, pp. 43-44.

Hurst, W. et al.; User Interfaces for Browsing and Navigation of Continuous Multimedia Data; 2002; pp. 267-270; XP002407105.

Source is Wikipedia page for Podcast, "Podcast", pp. 1-15, dated Apr. 20, 2006, http://en.wikipedia.org/w/index.php?title=Podcast&oldid=49340826, retrieved Feb. 1, 2008.

Decision of Rejection in Japanese Application No. 2004-363653 dated Feb. 16, 2009.

Notice to Submit Response in Korean Patent Application No. 10-2004-0093688 dated Apr. 28, 2006.

Notice to Submit Response in Korean Patent Application No. 10-2004-0093688 dated Jan. 29, 2007.

Non-Final Rejection After Notice of Appeal in Korean Patent Application No. 10-2006-7014132 dated Mar. 31, 2009.

Non-Final Rejection After Notice of Appeal in Korean Patent Application No.10-2006-7014132 dated Sep. 22, 2008.

Final Rejection in Korean Patent Application No. 10-2006-7014132 dated Apr. 22, 2008.

Non-Final Rejection in Korean Patent Application No. 10-2006-7014132 dated Sep. 10, 2007.

Office Action in Japanese Patent Application No. 2004-363650 dated Mar. 17, 2008.

Notification of Reason for Rejection in Japanese Patent Application No. 2004-363650 dated Oct. 6, 2008.

Decision of Rejection in Japanese Patent Application No. 2004-363650 dated Jun. 8, 2009.

Reason for Rejection in Japanese Patent Application No. 204-363650 dated Dec. 14, 2009.

Office Action for EU Appl. No. 04 026 849.2 dated Oct. 19, 2005.

Office Action for EU Appl. No. 04 026 849.2 dated Oct. 19, 2006.

Temple, "The Complete Idiot's Guide to Microsoft Outlook 2000", May 1999, Que, pp. 196-202.

First Office Action for CN Application No. 200410094736.6 dated May 25, 2007.

Second Office Action for CN Application No. 200410094736.6 dated Feb. 29, 2008.

Non-Final Rejection for Korean Application No. 10-2008-7020507 dated Feb. 5, 2010.

Office Action for EU Appl. No. 04 801 397.3 dated Jan. 4, 2008.

International Preliminary Report on Patentability for International Appl. No. PCT/IB2004/004161 mailed Jun. 29, 2006.

International Search Report and Written Opinion for International Appl. No. PCT/IB2004/004161 mailed Mar. 31, 2005.

European Search Report for Appl. No. 04 02 6849 completed Jun. 30, 2005.

First Office Action for CN Appl. No. 200410103385.0 dated Nov. 3, 2006.

Office Action for Korean Appl. No. 10-2004-0093733 dated May 22, 2006.

Office Action for European Appl. No. 04 026 173.7 dated Nov. 13, 2007.

European Search Report for Appl. No. 04026173.7 dated Nov. 27, 2006.

Non-Final Office Action for U.S. Appl. No. 10/792,175 dated Mar. 9, 2007.

Final Office Action for U.S. Appl. No. 10/792,175 dated Sep. 12, 2007.

Advisory Action for U.S. Appl. No. 10/792,175 dated Dec. 27, 2007.

Board of Appeals Examiner's Answer for U.S. Appl. No. 10/792,175 dated Jul. 22, 2008.

Non-Final Office Action for U.S. Appl. No. 10/715,187 dated Mar. 1, 2007.

Final Office Action for U.S. Appl. No. 10/715,187 dated Sep. 12, 2007.

Non-final Office Action for U.S. Appl. No. 10/715,187 dated Apr. 16, 2008.

Final Office Action for U.S. Appl. No. 10/715,187 dated Sep. 19, 2008.

Non-Final Office Action for U.S. Appl. No. 10/715,187 dated Apr. 1, 2009.

Final Office Action for U.S. Appl. No. 10/715,187 dated Dec. 4, 2009.

Non-Final Office Action for U.S. Appl. No. 10/715,095 mailed Feb. 26, 2007.

Final Office Action for U.S. Appl. No. 10/715,095 mailed Aug. 2, 2007.

Advisory Action for U.S. Appl. No. 10/715,095 mailed Aug. 29, 2007.

Non-Final Office Action for U.S. Appl. No. 10/715,095 mailed May 8, 2008.

Final Office Action for U.S. Appl. No. 10/715,095 mailed Nov. 6, 2008.

Advisory Action for U.S. Appl. No. 10/715,095 mailed Jan. 15, 2009.

* cited by examiner

FIGURE 1

| | 110 | 110 | 110 | |
|---|---|---|---|---|
| | Wednesday 19.6. | Thursday 20.6. | Friday 21.6. | |
| | 6:00 | 6:00 | 6:00 | 120 |
| | 7:00 | 7:00 | 7:00 | 120 |
| | 8:00 Dentist | 8:00 Sales Meeting | 8:00 Weekly Meeting | 130 |
| 130 | 9:00 Teleconf with Micron | 9:00 | 9:00 | 120 |
| | 10:00 | 10:00 CRM Workshop | 10:00 | 120 |
| | 11:00 | 11:00 | 11:00 Lunch with Sue | 120 |
| 150 | TIME NOW 12:21 | 12:00 | 12:00 | 120 |
| 140 | 13:00 📷 Factory Visit | 13:00 | 13:00 | 120 |
| | 14:00 | 14:00 | 14:00 | 120 |
| 140 | 15:00 | 15:00 📷 Football training | 15:00 Midsummer party | 130 |
| | 16:00 | 16:00 | 16:00 | |

TIME HANDLE IN A MEDIA DIARY APPLICATION FOR ACCESSING MEDIA FILES

FIELD OF THE INVENTION

The present invention relates to digital storage and management of media files and, more specifically, to a media file management application that incorporates a time handle that is displayed within the application and allows the user to access time segments and media files stored within the application.

BACKGROUND OF THE INVENTION

The rapid growth of digital communication has made it possible for all kinds of digital media items to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital media items that will be communicated amongst these devices will increase at an alarming rate.

In addition to the onset of more and more digital devices possessing digital communication capabilities, the digital storage capacity of these devices is constantly increasing. In the near future the majority of mobile digital communication terminals may well be equipped with storage capacity in the gigabyte range or greater, allowing these devices to store an enormous amount of digital data. In this environment it will no longer be prohibitive from a memory capacity standpoint to store a voluminous amount of large file types, such as video, audio or other multimedia files.

In the digital communication environment where more and more digital devices, both wireless and wired, are equipped with a means for digital communication and where the storage capacity of these devices has become seemingly endless, the digital communication device will encounter and store innumerable digital media files. As such, the digital communication device will desire a means to access, store, manage and further communicate these digital files in an efficient and user-friendly environment.

For example, if a digital communication device receives a digital media file the user of the device would benefit greatly from an application that automatically places the file into a readily accessible storage area and where managing and accessing of the file in the future can occur efficiently, without the user having to spend a great deal of time searching for the media file.

Most digital communication devices, such as desktop or laptop computers, personal data assistants (PDAs) or the like either come equipped or can be configured by the user to implement a daily planner application. The daily planner allows the user to coordinate and manage their upcoming schedule of events by inputting event reminders in a digital calendar. The digital planner provides the unique benefit of sending the user electronic reminders, in the form of alarms or visual or audible messages, when an upcoming event is pending. The digital planner has proven to be a highly successful tool for the businessperson and, in most instances, has replaced the need for conventional hard copy or paper daily planers.

Most digital media files can be easily categorized and stored according to a calendar date. For example, a wedding video can be categorized according to the date of the wedding and photographs taken at a party can be categorized according to the date of the party. These are examples of categorizing the media file based on the creation date of the media file. In other instances the media file can be associated with the date on which the media file is used or presented or the date on which the recipient receives the file. For example, a multimedia presentation for a business meeting may be categorized according to the date of the presentation and a personal text file from a friend may be categorized according to the date received.

Over time, digital devices with large memory capacity possess the capability to acquire and store an enormous volume of media files. This is especially true as we enter a burgeoning digital communication era where more and more digital devices will possess the capability to communicate digitally. For example, in a future where more and multi-function digital devices are prevalent, such as mobile telephones with digital cameras and conventional digital cameras, digital video recorders and the like have the capability to communicate digitally, the devices will be inundated with digital media files. The user of these devices, and all other digital devices capable of media storage, will desire an application that stores and manages the digital media files. A key attribute for such an application is user efficiency; because the user must be able to efficiently locate media files.

An additional concern of handheld digital communication devices is that the devices are characteristically small in size to accommodate being held in one's hand. Applications that are implemented in such devices will gain acceptance by device users if the user can navigate them ergonomically. In this regard, applications that either minimize the amount of inputs required of the user or minimize the physical effort or discomfort encountered by the user's hand in making inputs is preferred.

Therefore, the need exists to develop a media file storage and management application for a digital device that will provide for the storage of a large volume of media files and user efficiency in terms of being able to quickly locate a specific media file. The media file storage and management application should be capable of associating and organizing the media files according to a period of time, such as a day, week or the like. As such, the media management application should provide the user with a system for easily navigating through the time periods in order to efficiently locate a media file.

BRIEF SUMMARY OF THE INVENTION

The present invention provides for a media management application implemented in a digital device that incorporates a media handle. The media handle is moveable within a display to provide the user of the application with viewable access to media file representations or calendar events. The media handle may be displayed in conjunction with an information view, such as a media view, a calendar view, a timeline view or the like, such that the media handle provides access to desired items of information within the corresponding information view. The media handle of the present invention provides the device user with a highly efficient means of locating time periods and the media files associated with the time periods. In addition, the media handle provides ergonomic benefit to the user, in that, user inputs to the device are limited and the user inputs that are required are user-friendly.

In one embodiment of the invention an application for providing access to media files on a digital device is defined. The application includes a computer readable storage medium having computer-readable program instructions embodied in the medium. The computer-readable program instructions will include first instructions for generating a media view that provides access to digital media files and associates digital media files with a period of time. Additionally, the computer-readable program instructions will include second instructions for generating a media handle that is displayed in conjunction with a media view and is moveable within the media view to provide viewable access to digital media files.

The application may also include third instructions for generating a time bar that is displayed in conjunction with the media view and provides for time to be divided into segments. In those embodiments that include a time bar the second instructions may further provides for generating a media handle that is moveable along the time bar to provide access to the time segments. Access to time segments provides for display in the media view of viewable media files associated with the time segment.

The application may also include third instructions for generating a calendar view that represents time in calendar format and associates events with respective periods of time. In those embodiments that include a calendar view the second instructions may further provide for generating a media handle that is moveable within the calendar view to provide viewable access to periods of time or calendared events.

Typically, the first instructions for generating a media view may associate digital media files with a past period of time and the third instructions for generating a calendar view may associates events with respective future periods of time.

Additionally, the second instructions for generating a media handle may further provide for generating a center mark associated with the media handle that corresponds to period of time within the media view and/or a time segment within the time bar. The second instructions may also generate a time indicator associated with the media handle that indicates a time period that typically corresponds to the time period, either in the media view, the calendar view or the time bar, which generally underlies the media handle.

The invention is also defined by an application for providing access to information on a digital device. The application includes a computer readable storage medium having computer-readable program instructions embodied in the medium. The computer-readable program instructions include first instructions for generating an information view that provides access to items of information associated with a period of time and wherein the information view provides for a first time layer to be divided into segments in a first time scale. For example, the information view may be a media view or a calendar view and the items of information may be media files or calendar events or reminders. Additionally, the computer-readable program instructions will include second instructions for generating a time bar, displayed in conjunction with the information view, wherein the time bar provides for a second time layer to be divided into segments in a second time scale and third instructions for generating a moveable media handle, displayed in conjunction with the information view and the time bar. Movement of the media handle along the time bar moves simultaneously the information view and the time bar. Additionally, the application may provide for movement of the media handle along the time bar, which moves simultaneously the information view and the time bar an amount according to the amount of the movement of the media handle or the amount of the movement of the time scales of the time layers.

In an alternate embodiment of the invention, a digital device is defined. The digital device will include a processing unit that executes computer-readable program instructions for accessing media files. The computer-readable program instructions will include first instructions for generating a media view that provides access to digital media files and associates digital media files with a period of time. Additionally, the computer-readable program instructions will include second instructions for generating a media handle that is displayed in conjunction with a media view and is moveable with in the media view to provide viewable access to digital media files. The digital device will also include a display in communication with the processing unit that presents a combined view of the media view and the media handle.

The digital device may further include third instructions for generating a time bar that is displayed in conjunction with the media view and provides for time to be divided into segments. In those embodiments that implement a time bar, the second instructions may further provide for generating a media handle that is moveable along the time bar to provide access to time segments.

The invention is also embodied in a method for accessing media files in a media management application. The method includes the steps of providing for a media view that provides viewable access to digital media files in relation to a period of time and providing for a media handle, in conjunction with the media view, that is stationary in a generally centerline position, the centerline position associated with a first period of time in the media view. The method also includes the steps of deviating the media handle, a selected distance from a centerline position, the selected distance associated with a second period of time in the media view and releasing the media handle in the generally centerline position such that the centerline position is associated with the second period of time in the media view. The step of releasing the media handle may occur automatically upon release of the deviated media handle.

The method may include the additional step of providing viewable access to media files associated with the second period of time upon releasing the media handle in the generally centerline position. The method may also include the step of providing for a time bar, in conjunction with the media view and the media handle, which provides for time to be divided into segments.

Therefore, the present invention provides for a media diary or media management application implemented in a digital device that incorporates a media handle mechanism. The media handle mechanism is moveable within the display to provide the user of the diary an efficient tool for accessing media files and/or calendar events. The media handle may be displayed in conjunction with a media view, a calendar view and/or a time bar, such that the media handle provides access to desired portions of the media view, the calendar view or the time bar. The media handle of the present invention provides the device user with a highly efficient means of locating time periods and the media files associated with the time periods. In addition, the media handle provides ergonomic benefit to the user, in that, user inputs to the device are limited and the user inputs that are required are user-friendly.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a media diary or media management application implemented in a digital device that incorporates a media handle, also referred to as a time handle. The media handle is displayed to the media diary user in conjunction with a media view or a media view and calendar view. The media handle is moveable within the display, horizontally or vertically, typically by mouse-type or keypad function, for the purpose of providing viewable access to media files in the corresponding media view or events in the calendar view.

The media handle may also be implemented in conjunction with a time bar, which provides for time to be divided into segments. In this regard, the media handle may be moved in the general vicinity of a time bar segment to provide viewable access to the media view or calendar view associated with the segment of time.

The media handle of the present invention provides the user with an effective tool to easily navigate the media diary and to locate media files, segments of time or calendared events.

The media diary application of the present invention will associate media files with a predefined time, typically a moment of time or a period of time, or an event, so that the user can manage media files according to a moment of time, period of time or an event. Typically, the period of time will be a specific date associated with a date that the media file was created or intended for. For example, if the media file is an image or video file of a birthday party, the media application may categorize and store the file according to the date of the birthday party. For the purpose of the invention as disclosed the term "period of time" encompasses a moment of time and an event occurring within a period or moment of time. For a complete description of the media diary application see co-pending U.S. patent application Ser. No. 11/715,187, entitled, "Media Diary Application for use with Digital Device", filed on Nov. 17, 2003, in the name of inventor Myka et al., and assigned to the same assignee as the present invention. That application is herein incorporated by reference as if set forth fully herein.

The media diary application may take the displayed form of a media view and calendar view combined with a timeline view or a media view in combination with the timeline view. Collectively the views presented by the media diary application may be referred to herein as information views. In all embodiments of the media diary application any information view may incorporate the media handle of the present invention.

The media diary application of the present invention may be implemented and executed on any electronic device that incorporates a display, such as a desktop or portable computer, cellular telephone, personal data assistant (PDA), digital camera, digital camcorder, e-book device, television, digital audio player or the like. In addition the media diary application may be implemented on electronic devices that are connected to an external display, such as a set-top box (STB), personal video recorder (PVR), digital video recorder (DVR) or the like. While in most implementations the digital device that executes the media diary application will be capable of any type of wireless or wireline network communication, such as wireless telecom, short range radio network, Bluetooth®, Wireless Local Area Network (WLAN), Radio Frequency Identification (RFID), Internet Protocol Data Casting (IPDC), Digital Video Broadcasting (DVB), Infrared Data Association (IrDa), Internet or the like, it is not required that the digital device be adapted to communicate via network. Devices that are capable of requiring digital media files internally or may access media files through memory devices (e.g., flash storage device, memory sticks, video and audio storage tapes, CD, DVD, removable hard disc device (HDD) and the like) are also applicable.

In accordance with an embodiment of the present invention, the media diary application will be embodied by a computer-readable storage medium having computer-readable program instructions stored in the medium. The storage medium will typically be a memory device, such as flash ROM memory, HDD or the like. The programming instructions may be written in a standard computer programming language, such as C++, Java or the like. Upon execution by a processing unit as described below, the program instructions will implement the various functions of the media diary application as described below. The computer-readable program instructions include first instructions that will generate a media view that provides access to digital media files and associates digital media files with a moment of time, period of time or event. The computer-readable program instructions will include second instructions that generate a speed browser that provides for the periods of time in the media view to be efficiently accessed. In another embodiment, the computer-readable program instructions include third instructions that will generate a calendar view that represents time in calendar format and associates events with respective time information, such as moment or periods of time. While the first, second and third instructions may be modules, objects or the like that communicate with one another, the first, second and third instructions need not be discrete or separable portions of the program instructions and may be interspersed throughout if so desired.

Figure 1:
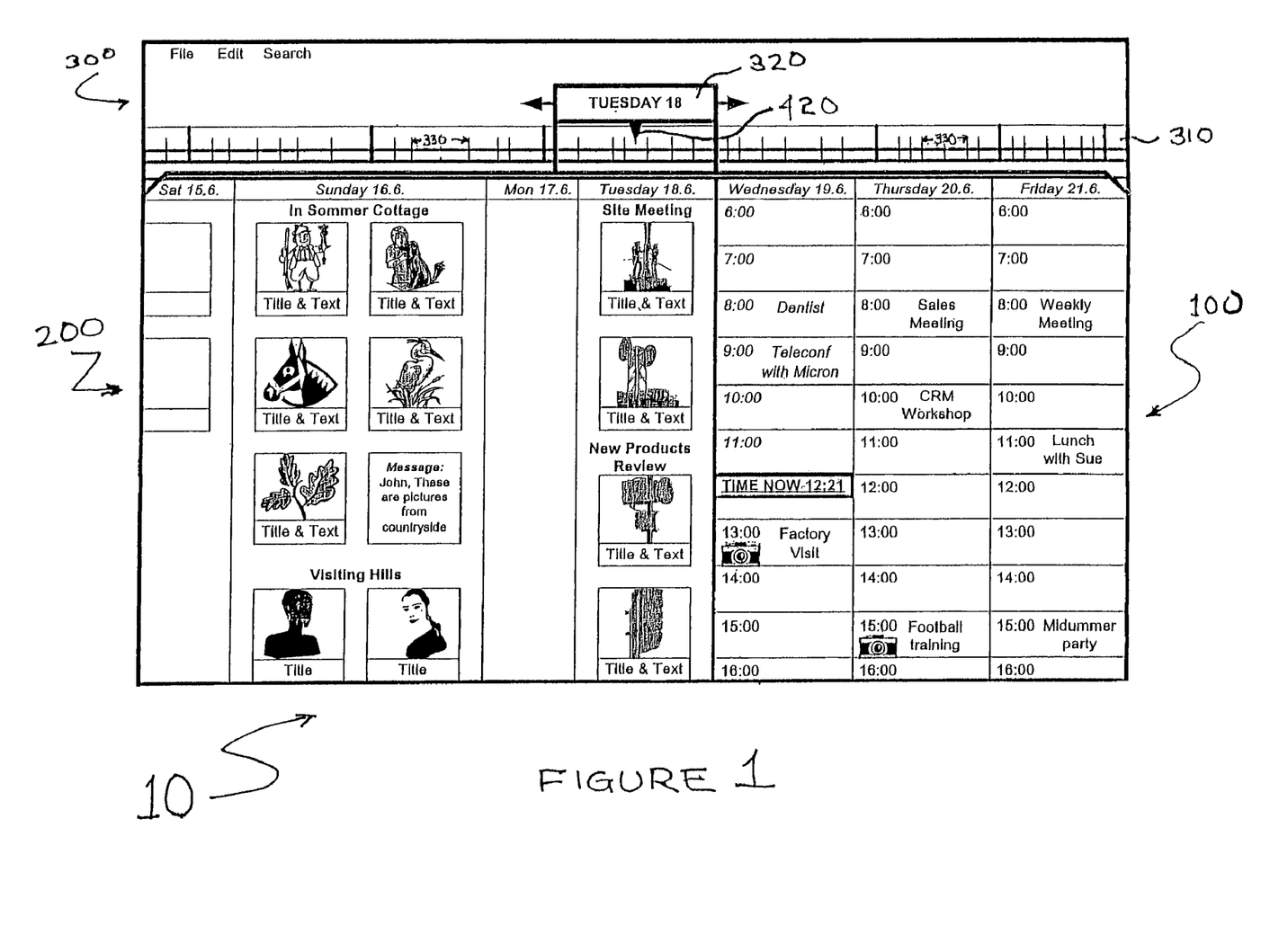
FIG. 1 is an illustration of a timeline view in combination with a calendar view and media view that incorporates a media handle, in accordance with an embodiment of the present invention

FIG. 1 illustrates an example of a media diary application display 10 that provides a calendar view 100, a media view 200 and a timeline view 300 with a media handle 320, in accordance with an embodiment of the present invention. Collectively, the media view, the calendar view and any other view presented by the media diary may be referred to as an information view. While typically the media view provides access to media files and the calendar view provides access to calendar events or reminders, collectively media files, calendar events/reminders and other information provided by the media diary views may be referred to as items of information. The timeline view will incorporate a media handle that can be moved, linearly and horizontally, from left to right on the display to provide viewable access to media files or calendar events. In accordance with embodiments of the present invention, a more detailed description of the media handle and its functionality and methods for use will be provided for later in the detailed description.

It is noted that the media handle 320 of the present invention may be implemented solely in conjunction with a media view (see FIG. 5), solely in conjunction with a calendar view or in conjunction with a combined display of both a media view and a calendar view (FIG. 1). In addition, while the timeline view of FIG. 1 implements a time bar, the media handle of the present invention may be incorporated without a time bar.

Figure 2:
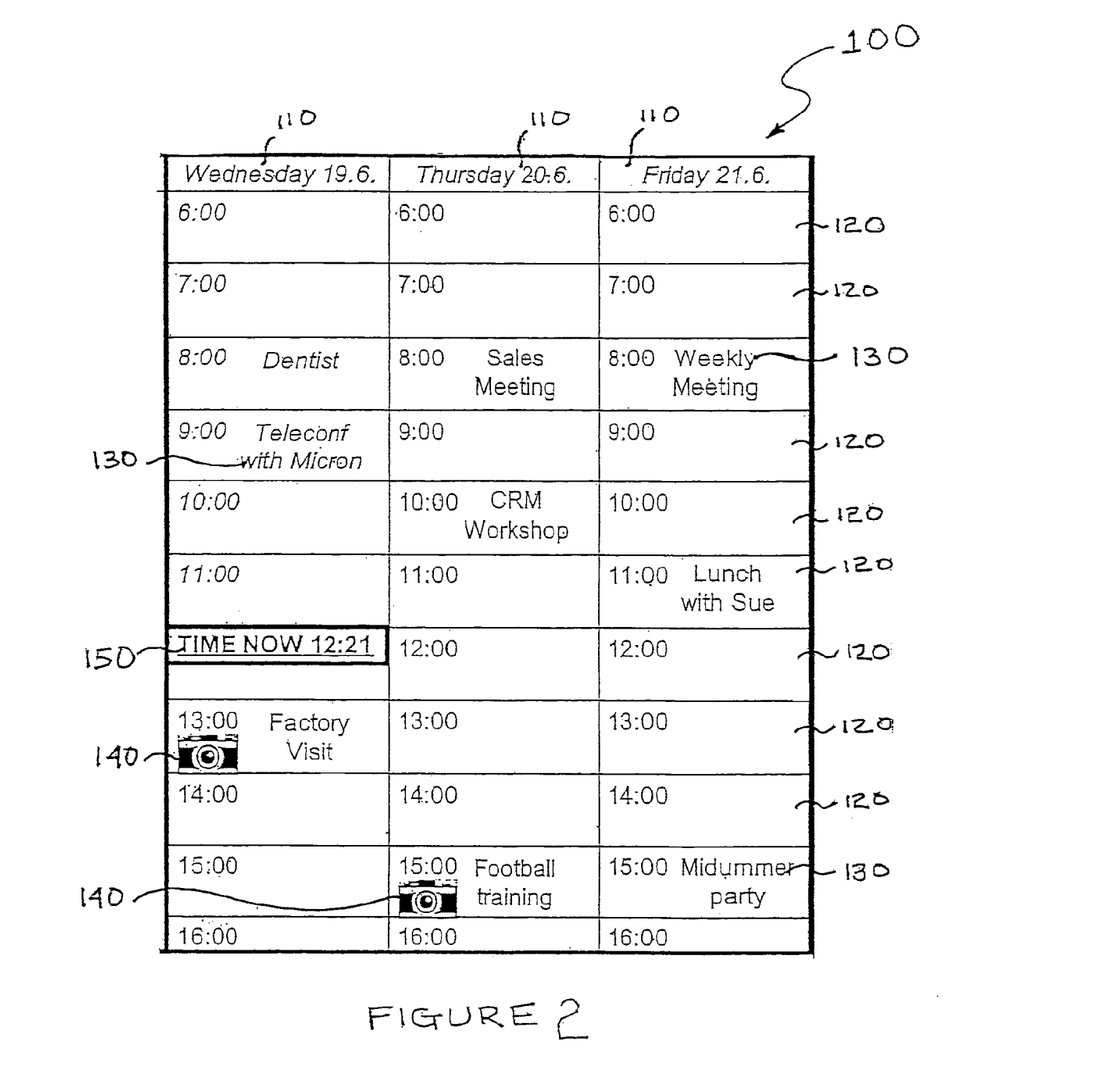
FIG. 2 is an illustration of a calendar view or calendar window as displayed by the media diary.
Figure 3:
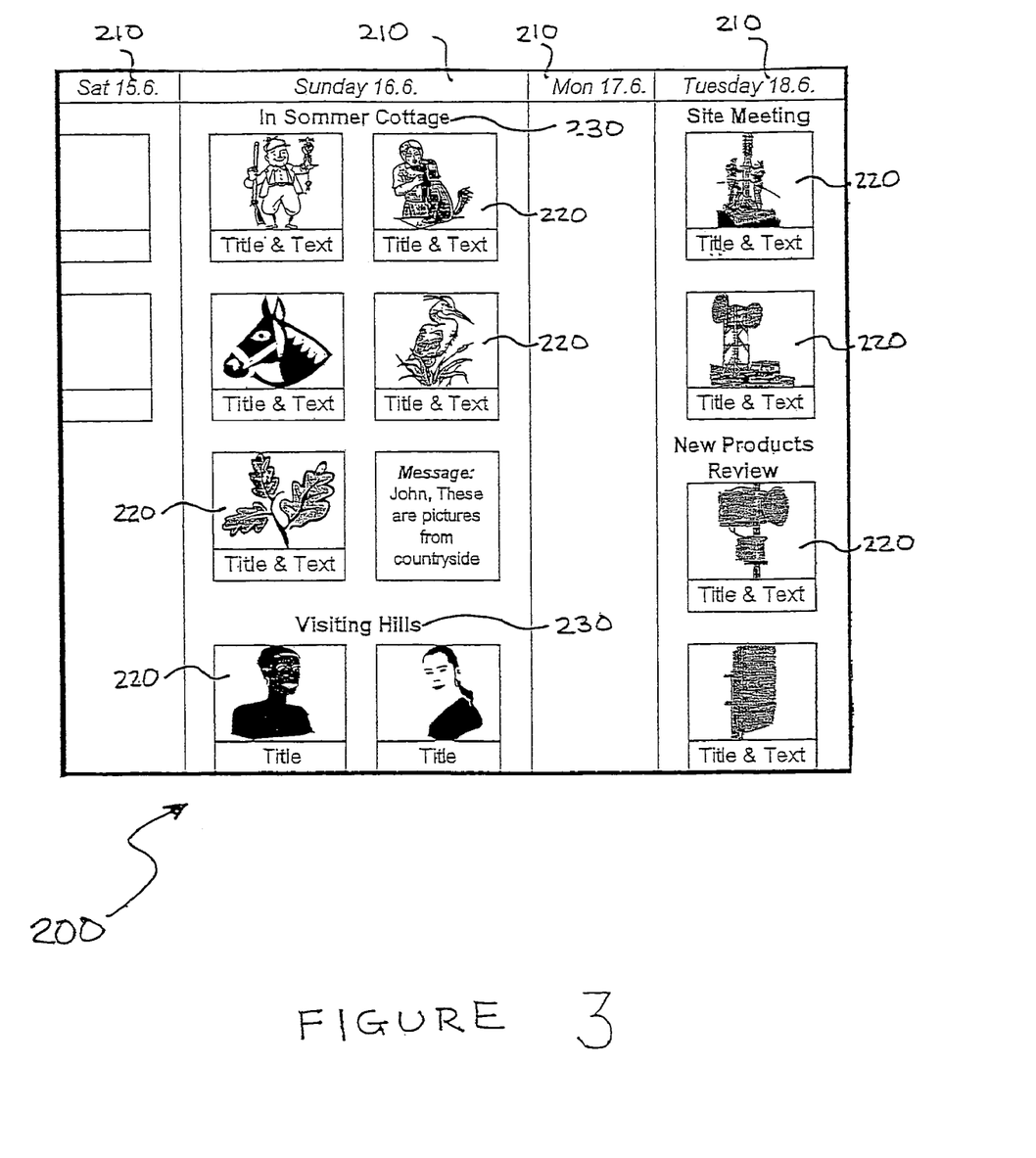
FIG. 3 is an illustration of media view or media window as displayed by the media diary.

In order to better understand the media diary application display 10 of FIG. 1, isolated representations of an exemplary calendar view and media view are presented in FIGS. 2 and 3.

FIG. 2 illustrates an example of a calendar view 100 that provides for the entry of calendar events and provides the user with a daily planner application. The calendar view may be displayed in conjunction with the media view and the time line view to present the media handle, in accordance with an embodiment of the present invention. The calendar view may be generated by computer-readable program instructions implemented in association with a digital device. It is noted that the calendar view herein depicted and described is by way of example only; other calendar views that provide for the display of calendar events or reminders are also contemplated and within the inventive concepts herein disclosed. While the calendar view is typically associated with future time periods, future events and future reminders, it may also be possible for the calendar view to display past time periods, past events and past reminders. Alternatively, the calendar view may be generated by another calendar or personal planner application, in which case, the calendar view is imported into the media diary application from the auxiliary calendar application.

The calendar view includes date columns 110, which correspond to a specific date. In the example shown, three date columns are visible on the display corresponding to the current date (i.e., Wednesday, 19 June) and the subsequent two dates. Typically, upon activation of the calendar view the current date will be displayed in the left-hand column of the calendar view with columns for the subsequent dates positioned sequentially to the right. As will be apparent, the calendar view may be differently oriented, such as with rows as opposed to columns or the current date may be displayed in the right hand column, if so desired. In an alternate embodiment the calendar view may include columns 110, which may correspond to any moment of time, such as year, month, day, hour or the like. Additionally upon activation of the calendar view the current moment of time may be displayed on the middle of the view.

The date columns 110 include multiple time blocks 120, which provide a descriptive area for information related to calendar events 130. In the embodiment shown, the time blocks correspond to one-hour time blocks, although the blocks may be for other lengths of time, such as 30-minute blocks. Further, for example if a column represents a year, the time block 120 may represent a month. The calendar view will be vertically scrollable, so that, all of the time blocks for a date column will be viewable by the user. In addition, the calendar view will typically be horizontally scrollable to provide for a view of other date or time columns 110. In addition, the time blocks may include reminder icons 140, which provide the media diary user a visual reminder related to an upcoming calendar event. For example in the depicted embodiment, the camera icon reminds the user that calendared event requires or will benefit from a having a camera on-hand.

The information related to calendar events 130 will typically be inputted by the user and include information, such as title of the event, topic of the event, date and time of the event, location of the event, individuals attending the event and the like. A calendar event may be inputted by activating, via keystroke or mouse-type input signal, the time block associated with the event. Upon activation, a window or view is made visible that allows for the user to input information related to the event. Once the calendar event has been inputted and text displayed in the time block, the details of the calendar events may be accessible by activating, via keystroke or mouse-type input signal, the calendar event. In addition to manually inputting calendar events, the media diary may import calendar events from other sources or applications that are being executed on the digital device, such as from other, internal or external, personal planner or calendar applications, email systems or the like. Further, the information related to a calendar event 130 creates metadata information related to the calendar event or reminder.

The time blocks 120 may include a time now indicator 150 that may be accentuated in bold-faced type or other way graphically accentuated in the time block that includes the current time. The time now indicator serves to indicate the current moment of time. The time now indicator will be an active indicator that displays the current time, in hour and minutes, and moves forward to the next time block with the passage of time. In addition, the calendar view 100 may graphically distinguish between time blocks and calendar events that are in the past and time blocks and calendar events that are in the future. In the illustrated example, time blocks and events in the past are designated by italicized text and time blocks and events in the future are designated by non-italicized, standard text. As the time now indicator moves to the next time block to indicate the passage of time, the distinguishing graphics of the time blocks and calendar events will also change to indicate the proper time state.

FIG. 3 illustrates an example of a media view 200 that provides for digital media files, such as digital images, digital video, digital audio, computer games, computer software, digital text files or the like, to be accessible to the media diary user, in accordance with an embodiment of the present invention. Typically the media files that are represented in the media view will be associated to a past calendar event or past reminder. The media view will be generated by computer-readable program instructions implemented in association with a digital device. It is noted that the media view herein depicted and described is by way of example only; other media views that provide for the display of media file representations in association with a moment of time or a time period are also contemplated and within the inventive concepts herein disclosed. Alternatively, the media files that are represented in the media view may be associated with a moment or period of time based on a timestamp in the media file, without having noted an event related to the media file, in advance, in the calendar view or application.

The media view of the illustrated embodiment includes date columns 210, which correspond to a specific date, although the media view may be differently oriented if so desired. The date columns of the media view provide for a time layer that divides time into segments according to a time scale. In the FIG. 3 embodiment the time scale is days, although the application may be configured for other time scales.

In the example shown in FIG. 3, four date columns are visible on the display corresponding to the four previous dates. In an alternate embodiment the media view may include columns 210, which may correspond to any moment of time, such as a year, a month, a week, a day, an hour or the like. The date columns will include media file representations 220 that are related to media files and are connected, in time, to the specific date, event and/or time. For example, the media file representations may include representations that provide the user with access to digital files, such as video files, image files, audio files, text files, emails, short message service (SMS) messages, multimedia message service (MMS) messages and the like and provide the user with information pertaining to the content of the files. The media file representations may include an icon, or a thumbnail image, a portion of the text of a text document or message or any other suitable media file representation with or without a title of the media file.

Typically, the media diary will receive the media file from a digital recording function associated with the device or via digital communication from other devices. For example:
1) If the digital device is a cellular telephone that incorporates a digital camera or any other digital device that serves as a digital recording device, a digital media file (i.e., image) may be communicated directly via cellular telephone access from the camera/telephone device to the media diary in another device.
2) If the digital device is an independent digital camera or any other digital recording/storing/playing device and equipped with a wireless or wireline network connection the digital media file may be communicated directly from networked device to a media diary in another device.
3) If the digital device is an independent digital camera or any other digital recording/storing/playing device and equipped with short range digital communication means the digital media file may communicated first to a long range digital communication device (i.e. cellular telephone, a PDA, laptop or the like) that then passes the files to another device with a media diary. Alternatively, in proximity, a file transfer may occur directly to another device with a media diary.
4) The media files may be communicated by a physical memory unit/device transferred from one device to another device.

As such, the digital recording/storing/playing device from which the media file is communicated (i.e., the passing device) may include, and implement, the media diary application or may not include the media diary application. If the passing device includes the media diary application, the media files may be processed for media diary purposes prior to communication to other devices.

The communication/synchronization of the media files may be automatic after a creation of a new media file, or after a certain amount of media files have been created. Alternatively, the communication may occur at a selected time or on a request of a user and may include a single media file or a group of media files. The communication/synchronization may occur via any wireless or wireline network communication method, such as for example via SMS, MMS or file transfer. The communication, i.e. synchronization, may also occur from a back end media diary application/device to any digital recording/storing/playing device with or without the media diary application.

The media file will typically have associated metadata, in the form of a timestamp, event name, file name, location information, people in the event or in the media file, objects in the media file, file type, file size or the like. The media file metadata may be automatically inputted by the digital recording device at the time of the creation of the media file or may be manually inputted, such as at the time of creation of the media file or receipt or transfer of the media file. In addition, it is possible for the metadata to previously exist in conjunction with a calendar event in the media diary and to be associated with the digital media file at the moment the file is created, if the device creating the media file executes the media diary application.

Once the media diary receives the media file, the media file metadata is combined and/or correlated with the calendar event information. The combined and/or correlated information is associated with the media file in the media view, such that, when a user accesses the media file via the media file representation the user will be presented with the combined metadata and calendar event information. See for example, media file representations 220 of FIG. 3, in which, a thumbnail image is combined with a title and text entry.

Referring again to FIG. 1, which depicts media application display 10 that is a combination of a calendar view 100, a media view 200 and a timeline view 300. The timeline portion of the view incorporates a media handle, in accordance with an embodiment of the present invention. As depicted, the calendar view 100 is displayed on the right-hand side of the digital device's display, the media view 200 is displayed on the left-hand side of the display and the timeline view features are displayed above both the calendar view and the media view. The timeline view and, specifically, the media handle will be generated by the computer-readable program instructions as implemented in association with a digital device. It is noted that the timeline view and, specifically, the media handle herein depicted and described is by way of example only; other configurations of timeline views and media handles that provide for the display of a timeline and media handle function in combination with a media view and/or a calendar view are also contemplated and within the inventive concepts herein disclosed.

In addition to the media handle 320, the timeline view 300 may also incorporate a time bar 310. The time bar will typically be displayed horizontally across the viewable area of the display. However, in alternate embodiments the time bar may be displayed vertically. In such embodiments, the media handle would provide for vertical movement along the vertical time bar and the corresponding media views and/or calendar views would scroll vertically. The time bar provides for a time layer within the media diary application that divides time into segments according to a time scale. For example, in one embodiment of the invention the time scale is defined by dates, i.e., each time bar segment represents a specific date. In the illustrated embodiment, the hash marks in the time bar define the segments, representing dates and the bold-faced lines of the time bar indicate weeks. The length of the time bar segment will typically correspond to the volume of media files associated with the segment. Volume may be defined in terms of the quantity or number of media files or volume may be defined in terms of the storage size (i.e., bytes) of the media files. As such, a longer length segment may indicate a large volume of media files, while a shorter length segment may indicate a small volume of media files or no media files.

The media handle will be moveable on the display for the purpose of providing viewable access to media files in the media view and/or viewable access to events in the calendar view. The media handle 320 depicted in FIG. 1 is shown in a stationary rest position, preferably in a centerline position, e.g. in FIG. 1 related to a time bar, or related to display of the media diary application and in FIG. 4 related to a media view. In the centerline position the media handle is associated with an underlying column of the media view and the media handle will display the date associated with the underlying column. Additionally, in the centerline position the media handle will typically be associated with an underlying time unit, such as a day, of the time bar. The media handle will typically display the time unit, such as the date, associated with the underlying time unit in the media handle.

Figure 4:
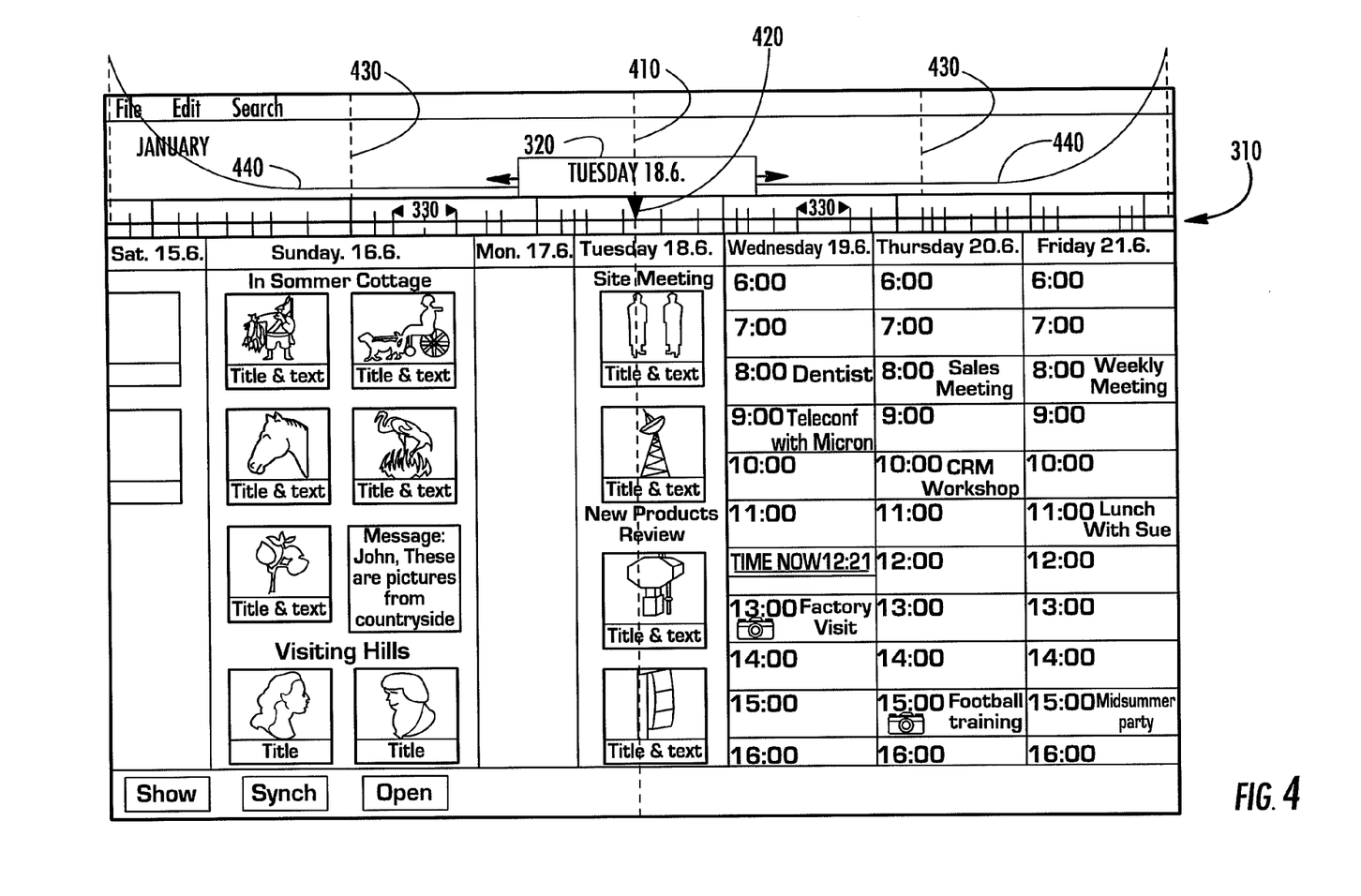
FIG. 4 is an illustration of a media diary view depicting how a media handle is moved to access media files, in accordance with an embodiment of the present invention.

The media handle 320 will typically have a center mark 420 for indicating a center point of the media handle. When the media handle is in a rest position, typically a centerline position, the center mark will point to an associated time unit 330 within the time bar 310. The associated time unit will typically be indicated on the media handle and either the media view or the calendar view associated with the time unit will generally underlie the center mark. When the media handle is moved to a deviated position (i.e., a position to the left or right of the centerline position), the center mark will point to an associated time unit within the time bar. In the deviated position the media view or calendar view associated with the time unit will be scrolling into the viewable area of the display.

In addition, in certain embodiments of the invention the media handle may be configured such that the length of the stationary media handle 320 overlies the time units 330 in the time bar 310 that are currently being displayed in the media view 200 and/or calendar view 100. In the illustrated example of FIG. 1, the length of the media handle overlies at least a portion of seven time units, these seven times units correspond to the 7 days in the media and calendar views; 4 days in the media view (15 June-18 June) and 3 days in the calendar view (19 June-21 June). In this regard, the media handle will automatically deviate in length to accommodate the amount of time units that are currently within the viewable area of the display. Areas of the time bar that do not underlie the media handle provide the user with a visible-indication of media file content in time periods outside of those displayed in the viewing area.

In a manual movement mode movement of the media handle is typically accomplished by keystroke or mouse-type activation. Typically a click and drag function of a mouse-type interface is used to move the media handle to the left or to the right. For example, in the FIG. 1 embodiment, if the user moves the media handle to the left, the calendar view and media view will scroll to the right, such that, more past dates in the media view will be displayed. If the user moves the media handle to the right, the calendar view and media view will scroll to the left; such that, more future dates in the calendar view will be displayed.

If the media handle 320 is deviated a relatively short distance from the center position, deliberate speed scrolling will occur in the media view and/or calendar view. In this instance, the media view and/or the calendar view will move relatively slowly in the opposite direction of the deviation and the corresponding dates and media file representations will appear in the display area. If the media handle is deviated a relatively long distance from the center position, fast scrolling will occur in the media view, calendar view and/or time bar. An example of a relatively long distance would be deviating the media handle to a position adjacent to a horizontal end of the display. In this instance, the time bar, the media view and/or calendar view will move relatively fast in the opposite direction of the deviation and the corresponding dates and media file representations will appear in the display area. Once the media handle is released from the deviated position, the media handle will return, automatically, to the rest position, such as the centerline position. Once the media handle returns to the centerline position, the media handle will indicate the date at the moment the media handle was released from the deviated position and the media view column, calendar view column or time bar unit associated with the moment of time, such as the date, will underlie the center positioned media handle.

For example, if the user of the media diary 10 wishes to access a date in the near past, the user will deviate the media handle 320 a relatively short distance, e.g. to the left. Moving and holding the media handle a short distance to the left, will invoke deliberate scrolling of the past dates. When the desired date is evident on the media handle, the user may release the media handle. Release of the media handle will automatically reposition the media handle in the centerline position and the desired date and associated media view or calendar view will underlie the media handle.

Alternately, if the user of the media diary wishes to access a date in the distant past, the user will deviate the media handle, e.g. to the far left of the display (i.e., adjacent to the left side of the display), preferably along the time bar. Moving the media handle to the far left of the display, will invoke fast scrolling of the past dates. This entails hastily ramping up the scroll function from a slow scrolling speed to a fast scrolling speed. When the user is in the near vicinity of the date they wish to access, the media handle can be released to move the time bar back to the centerline position. Releasing the media handle to reposition the media handle in the centerline position also repositions the time bar, the media view and the calendar view, accordingly. This will allow the user to focus in on the desired date by deviating the media handle a relatively short distance from the centerline. Alternatively, when the media bar is positioned to the far left of the display and the scrolling function has moved into the vicinity of the desired date, the media handle can be moved to the right to slow down the scrolling function. Slowing down the scrolling function will allow the user to focus in on the desired date and smoothly center the desired content in the media view.

FIG. 4 provides an illustrative example of how the media handle is moved/deviated to access media files, in accordance with an embodiment of the present invention. The media handle 320 is initially in a stationary position, as depicted the stationary position centers the media handle with the centerline 410. As such, in the depicted stationary position the center mark 420 of the media handle resides on the centerline. When the media handle is deviated from the stationary position (i.e., moved left or right from the center line) the view of the media diary application will scroll in the direction opposite of the direction of the deviation. Thus, as depicted, deviation of the media handle to the right, will scroll more of the calendar view into the viewable area of the display and deviation of the media handle to the left, will scroll more of the media view, and associated media file representations, into the viewable area of the display.

When the media handle 320 is deviated a predefined "short" distance the scrolling that results is deliberate step-wise scrolling in accordance with the time units 330 in the underlying time bar 310. Alternatively, the scrolling is continuous (i.e., without steps) or according to a predetermined number of steps. This enables presentation of media files in instances in which a time unit includes a large volume of media files (i.e., the time unit 330 in the time bar 310 is characteristically wide in length). In the illustrated example the predefined "short" distance is defined as the distance between imaginary marks 430. As long as the media handle is deviated between marks 430, the step-wise scrolling is limited to the underlying media or calendar view (i.e., the time bar remains stationary). Thus, as the media handle is moved, the center mark 420 will point to the time unit that will move to the centerline in the absence of further movement of the time handle. In addition, as the media handle is moved a time column 210 within the media view 200 or the calendar view 100 that is related to the time unit indicated by the center mark will synchronously scroll to a position under the centerline 410 in the media diary view. For example, if the time units 330 in the illustrated example are days, as the media handle is moved, once the center mark encounters the time unit on the time bar, the corresponding date associated with the time unit will be displayed in the media handle, the date will be scrolled into the media view or calendar view, and associated media file representations or calendar event reminders will be visible on the display proximate the centerline 410. And more precisely, a portion of the time column 210 that corresponds to a portion of the time unit 330 indicated by the center mark is scrolled into the media view or calendar view and media file representations or calendar event reminders associated with the portion of the time unit will be visible on the display proximate the centerline 410.

Once the center mark 420 of the media handle 320 is deviated beyond the predefined "short" distance (i.e., mark 430), the time bar will scroll simultaneous with scrolling of the underlying media view or calendar view. When the extent of the deviation is further increased beyond mark 430 the scrolling speed will increase, such as in a linear fashion or an exponential fashion, as indicated by the speed line 440, this is referred to as accelerated or speed browsing. The speed line is shown for illustrative purposes only and does not actually appear in the timeline view of the media diary application. In the accelerated browsing mode, the media handle may be held in a stationary position to provide for accelerated browsing through periods of time. Additionally, in the accelerated browsing mode the center mark of the media handle will point to a time unit in the scrolling time bar, the time unit will be rapidly displayed in the media handle and the media view and/or calendar view will be rapidly scrolled. Once the deviated media handle is released, it returns, automatically, to a rest position, typically the centerline 410 position. The time unit that the center mark points to, as well as, the media handle becomes centered in the display.

For a more detailed discussion of the scrolling function and the ability to provide for adjustment of the scrolling speed, see co-pending U.S. patent application Ser. No. 11/715,095, entitled "Speed Browsing of Media Items in a Media Diary Application", filed on Nov. 17, 2003, in the name of inventors Lindholm et al., and assigned to the same entity as the present invention. That application is herein incorporated by reference as if set forth fully herein.

Figure 5:
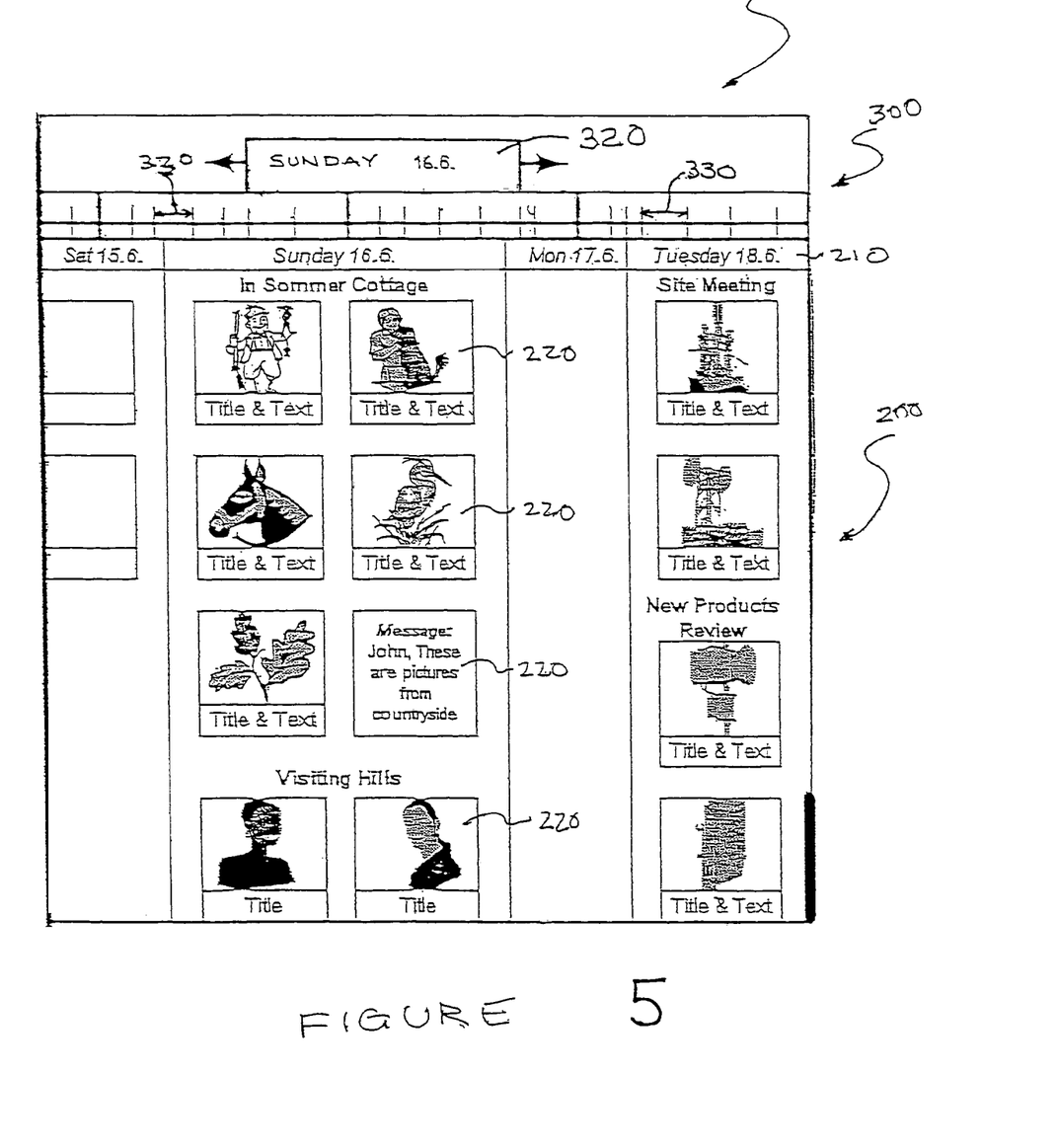
FIG. 5 is an illustration of a media view that incorporates a media handle, in accordance with an embodiment of the present invention.

FIG. 5 illustrates an alternate embodiment of the present invention, in which, the media diary display includes a combination of a media view 200 and a media handle 320. In this embodiment, the computer-readable program instructions will generate a media view that provides access to digital media files and associates digital media files with a period of time. The instructions will additionally generate a media handle. The media view includes date columns 210, which correspond to a specific date. In the example shown, four date columns are visible on the display corresponding to four dates. The date columns will include media file representations 220 that are related to media files and are connected, in time, to the specific date and may further be connected within a date to a specific topic. For example, the media file representations may include representations that provide the user with access to digital files, such as video files, image files, audio files text files and the like and provide the user with information pertaining to the content of the files. The media file representations may include an image and title of a digital image or video file, a portion of the text of a text message or any other suitable media file representation.

In this embodiment of the invention, the date columns may include both past dates, present dates and future dates. While most media files will be categorized in past date columns it is possible for media events to be categorized in future date columns. For example, a yet-to-be presented multi-media presentation can be categorized under a future date column.

The features of the timeline view 300 will include a media handle 320 that is moveable within the display to provide viewable access to media files or calendar events. The media handle will typically be visible in the timeline view and be centered in the visible display in a stationary position. In the same manner as described above, the media handle can be moved to the left or right on the display to provide for viewable access to media file representations in the media view or calendar events in the calendar view. The media handle of the FIG. 4 embodiment will have all the configuration and functionality possibilities that have been described above in relation to FIG. 1.

Figure 6:
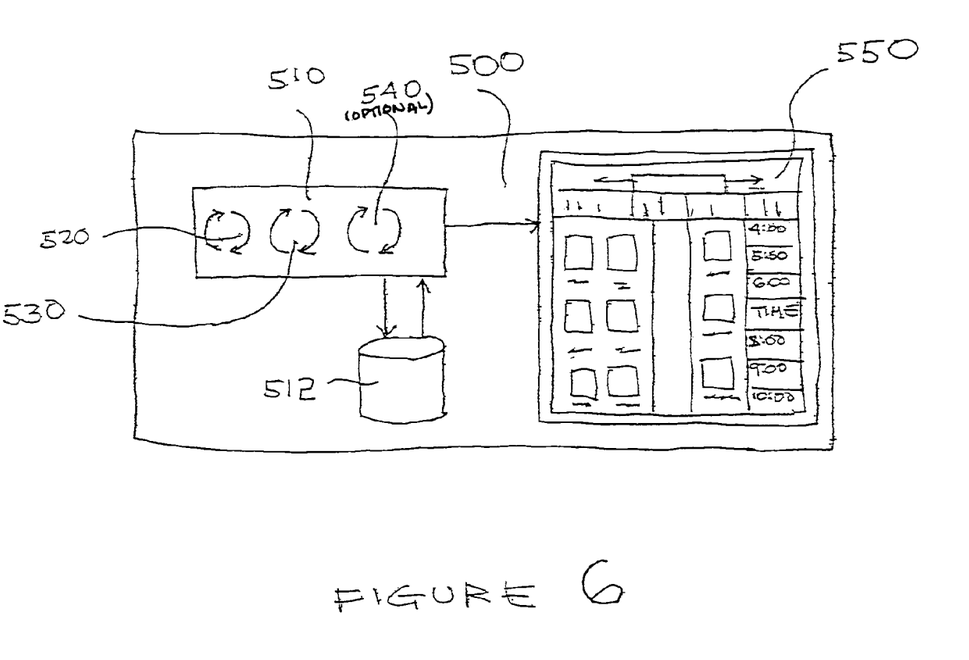
FIG. 6 is a block diagram of a digital device implementing a media diary that incorporates the use of a media handle/speed browser, in accordance with an embodiment of the present invention.

A further embodiment of the invention is defined by a digital device that implements the media diary application and specifically the media handle aspect of the media diary, in accordance with an embodiment of the present invention. FIG. 6 illustrates a block diagram of digital device 500 that implements the media diary. As previously noted, the digital device may be a digital device capable of digital communication by any means of network or by portable memory unit with other digital devices, such as a mobile terminal including for example, a mobile telephone, a PDA, laptop computer, a digital camera, a digital video camera, electronic book device, digital audio recorder, personal computer, set-top box (STB), television or the like.

The digital device 500 will include a processing unit 510, such as a processor, an application specific integrated circuit, analog and/or digital circuitry, or any other similar device that executes computer-readable program instructions for accessing media files. Wherein the program instructions and the media files are generally stored in memory device 512. The computer-readable program instructions may include first instructions 520 for generating a media view that provides access to digital media files and associates digital media files with a period of time, and second instructions 530 for generating a media handle that provides for the user to alter the speed of browsing function to efficiently locate media files within the media diary. In addition, the digital device will include a display 550 that is in communication with the processing unit and provides a presentation mechanism for the media view and the media handle.

In alternate embodiments of the digital device, the processing unit 510 may execute computer-readable program instructions, including optional third instructions 540 for generating a calendar view that represents time in calendar format and associates events with respective periods of time. Additionally, the processing unit may execute computer-readable program instructions, including optional third instructions 540 for generating a time bar that divides time into segments and is displayed in conjunction with the media view and media handle.

Figure 7:
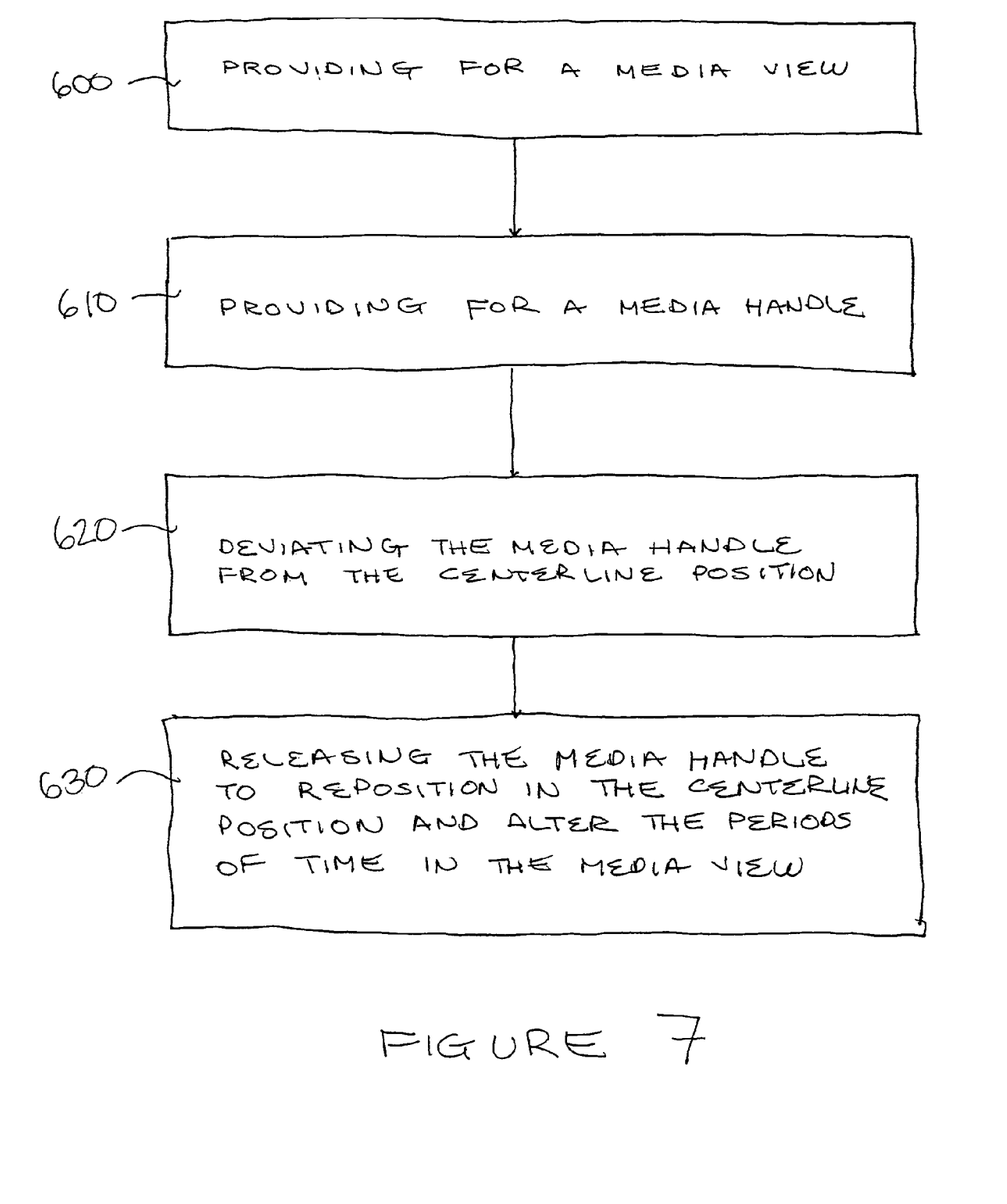
FIG. 7 is a flow diagram of a method for accessing media files with a media handle in a media management application, in accordance with an embodiment of the present invention.

Additionally, the invention is embodied in a method for accessing media files in a media management application. FIG. 7 is a flow diagram depicting the method for accessing media files in a media management application. At step 600, a media view is provided, which provides viewable access to digital media files in relation to a period of time. As previously noted a "period of time" also encompasses a moment of time or an event associated with a period or moment of time. At step 610, a media handle is provided in conjunction with the media view. The media handle is stationary in a generally centerline position, on a display; the centerline position being associated with a first period of time in the media view.

At step 620, the method includes the step of deviating the media handle a selected distance from the centerline position. The selected distance is associated with a second period of time in the media view. The process of deviating the media handle will typically involve a mouse-type click and hold function or a keystroke function. At step 630, once the media handle has been deviated, the media handle is released to the generally centerline position. Release back to the centerline position will provide for the media handle to be associated with the second period of time in the media view. Typically, the second period of time will generally underlie the centerline position of the media handle. In addition, release of the media handle to the generally centerline position will typically provide for viewable access to media files associated with the second period of time.

The method may additionally include the step of providing for a time bar, in conjunction with the media view and the media handle, which provides for time to be divided into segments. In those embodiments implementing a time bar, the media handle may be deviated a selected distance from the centerline position to generally align the media handle with a segment of time in the time bar. In addition, releasing the media handle to the generally centerline position will provide for the media handle to be associated with the segment of time in the time bar.

The described embodiments of the present invention provide for a media diary or media management application implemented in a digital device that incorporates a media handle mechanism. The media handle mechanism is moveable within the display to provide the user of the diary an efficient tool for accessing media files and/or calendar events. The media handle may be displayed in conjunction with a media view, a calendar view and/or a time bar, such that the media handle provides access to desired portions of the media view, the calendar view or the time bar. The media handle of the present invention provides the device user with a highly efficient means of locating time periods and the media files associated with the time periods. In addition, the media handle provides ergonomic benefit to the user, in that, user inputs to the device are limited and the user inputs that are required are user-friendly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer readable storage medium having computer-readable program instructions embodied in the medium, the computer-readable program instructions comprising:
   first instructions for generating a media view that provides access to digital media files and associates digital media files with a period of time; and
   second instructions for generating a media handle, displayed in conjunction with a media view, wherein the media handle is moveable within the media view to provide viewable access to digital media files,
   wherein the second instructions for generating a media handle further comprise instructions for causing stepwise scrolling based on a predefined time unit when the media handle is deviated from a predefined position into a first region, and causing a speed of scrolling that is proportional to the distance that the media handle is deviated from the predefined position when the media handle is deviated from the predefined position into a second region.

2. The computer readable storage medium of claim 1, further comprising third instructions for generating a time bar, displayed in conjunction with the media view, wherein the time bar provides for time to be divided into segments.

3. The computer readable storage medium of claim 2, wherein the second instructions for generating a media handle further provides for generating a media handle that is moveable along the time bar to provide access to time segments.

4. The computer readable storage medium of claim 3, wherein the second instructions for generating a media handle further provides for generating a media handle that is moveable along the time bar to provide access to time segments, wherein access to time segments provides for display in the media view of viewable media files associated with the time segment.

5. The computer readable storage medium of claim 2, wherein the second instructions for generating a media handle further provides for generating a mark associated with the media handle that corresponds to a time segment within the time bar.

6. The computer readable storage medium of claim 2, wherein the second instructions for generating a media handle further provides for a browsing step function that is proportional to a movement of the media handle along the time bar.

7. The computer readable storage medium of claim 1, wherein the first instructions for generating a media view further provides for associating digital media files with a period of time based upon information associated with the digital media file.

8. The computer readable storage medium of claim 1, further comprising third instructions for generating a calendar view that represents time in calendar format and associates events with respective periods of time.

9. The computer readable storage medium of claim 8, wherein the second instructions for generating a media handle further provides for generating a media handle that is moveable within the calendar view to provide viewable access to periods of time.

10. The computer readable storage medium of claim 9, wherein the second instructions for generating a media handle further provides for generating a media handle that is moveable within the calendar view to provide viewable access to calendared events.

11. The computer readable storage medium of claim 8, wherein the first instructions for generating a media view that provides access to digital media files and associates digital media files with a period of time further provides for associating digital media files with a past period of time, and wherein the fourth instructions for generating a calendar view that represents time in calendar format and associates events with respective periods of time further provides for associating events with respective future periods of time.

12. The computer readable storage medium of claim 1, wherein the second instructions for generating a media handle further provides for generating a mark associated with the media handle that corresponds to period of time within the media view.

13. The computer readable storage medium of claim 1, wherein the second instructions for generating a media handle further provides for generating a mark associated with the media handle that indicates a period of time when the media handle is deviated from a predefined position.

14. The computer readable storage medium of claim 1, wherein the second instructions for generating a media handle further provides for generating a time indicator associated with the media handle that indicates a date, wherein the date indicated generally underlies the media handle.

15. The computer readable storage medium of claim 1, wherein second instructions for generating a media handle further provides for generating a time indicator associated with the media handle that indicates a date, wherein the date indicated changes as the media handle is moved.

16. The computer readable storage medium of claims 1, wherein the second instructions for generating a media handle further provides for the speed of scrolling to accelerate when the media handle is deviated from the predefined position in the second region.

17. The computer readable storage medium of claim 1, wherein the second instructions for generating a media handle further includes instructions for increasing the speed of scrolling as the distance from the predefined position is increased when the media handle is deviated from the predefined position into the second region.

18. The computer readable storage medium of claim 1, wherein the second instructions for generating a media handle further includes instructions for decreasing the speed of browsing as the distance from the predefined position is decreased.

19. The computer readable storage medium of claim 1, wherein the second instructions for generating a media handle further includes instructions for generating a media handle that is moveable horizontally.

20. The application of claim 1, wherein the second instructions for generating a media handle further provides for generating a time indicator associated with the media handle that indicates a date, wherein the date indicated is generally disposed within the media handle.

21. A computer readable storage medium having computer-readable program instructions embodied in the medium, the computer-readable program instructions comprising:

first instructions for generating an information view that provides access to items of information associated with a period of time and wherein the information view provides for a first time layer to be divided into segments in a first time scale;

second instructions for generating a time bar, displayed in conjunction with the information view, wherein the time bar provides for a second time layer to be divided into segments in a second time scale; and third instructions for generating a moveable media handle, displayed in conjunction with the information view and the time bar, wherein a movement of the media handle along the time bar moves simultaneously the information view and the time bar, and wherein the third instructions for generating a moveable media handle further include instructions for causing step-wise scrolling based on a predefined time unit when the media handle is deviated from a predefined position into a first region, and causing a speed of scrolling that is proportional to the distance that the media handle is deviated from the predefined position when the media handle is deviated from the predefined position into a second region.

22. The computer readable storage medium of claim 21, wherein the first instructions for generating an information view that provides access to items of information further comprises first instructions for generating a media view that provides access to media files.

23. The computer readable storage medium of claim 21, wherein the first instructions for generating an information view that provides access to items of information further comprises first instructions for generating a calendar view that provides access to calendar events.

24. The computer readable storage medium of claim 21, wherein a movement of the media handle along the time bar moves simultaneously the information view and the time bar an amount according to the amount of the movement of the media handle.

25. The computer readable storage medium of claim 21, wherein a movement of the media handle along the time bar moves simultaneously the information view and the time bar an amount according to the amount of the movement of the time scales of the time layers.

26. The computer readable storage medium of claim 21, wherein a movement of the media handle along the time bar moves simultaneously the information view and the time bar and provides viewable access to the items of information.

27. An apparatus comprising at least one processor and at least one memory including computer program code, the at least one memory and the computer program code configured to, with the at least one processor, cause the apparatus at least to perform:

generating a media view that provides access to digital media files and associates digital media files with a period of time; and generating a media handle, displayed in conjunction with the media view, wherein the media handle is moveable with in the media view to provide viewable access to digital media files;

wherein generating the media handle includes causing step-wise scrolling based on a predefined time unit when the media handle is deviated from a predefined position into a first region, and causing a speed of scrolling that is proportional to the distance that the media handle is deviated from the predefined position when the media handle is deviated from the predefined position into a second region.

28. The apparatus of claim 27, wherein the apparatus is further caused to generate a time bar, displayed in conjunction with the media view, wherein the time bar provides for time to be divided into segments.

29. The apparatus of claim 28, wherein the apparatus is further caused to generate a media handle that is moveable along the time bar to provide access to time segments.

30. The apparatus of claim 28, wherein the apparatus is further caused to generate a media handle that is moveable along the time bar to provide access to time segments, wherein access to time segments provides for display in the media view of viewable media files associated with the time segment.

31. The apparatus of claim 27, further comprising a display in communication with the at least one processor, the display being configured to present a combined view of the media view and the media handle.

32. A method comprising:
providing for a media view on a display device that provides viewable access to digital media files in relation to a period of time;
providing for a media handle, in conjunction with the media view, that is stationary in a predefined position, the predefined position associated with a first period of time in the media view;
receiving an indication that the media handle has been deviated a selected distance from the predefined position, the selected distance associated with a second period of time in the media view; and
receiving an indication that the media handle has been released such that the predefined position is associated with the second period of time in the media view;
wherein upon receiving the indication that the media handle has been deviated the selected distance, causing step-wise scrolling based on a predefined time unit when the selected distance is within a first region or causing a speed of scrolling that is proportional to the distance that the media handle has been deviated from the predefined position when the selected distance is within a second region.

33. The method of claim 32, wherein receiving the indication that the media handle has been released occurs automatically upon release of the deviated media handle.

34. The method of claim 32, wherein receiving the indication that the media handle has been released further comprises providing viewable access to media files associated with the second period of time.

35. The method of claim 32, wherein receiving the indication that the media handle has been released further comprises scrolling the media view such that the second period of time in the media view is generally aligned with the predefined position of the media handle.

36. The method of claim 32, further comprising providing for a time bar, in conjunction with the media view and the media handle, which provides for time to be divided into segments.

37. The method of claim 36, wherein receiving the indication that the media handle has been deviated the selected distance further comprises receiving the indication that the media handle has been deviated the selected distance to generally align the media handle with a segment of time in the time bar.

38. The method of claim 37, wherein receiving the indication that the media handle has been released further comprises receiving the indication that the media handle has been released such that the predefined position is associated with the segment of time in the time bar.

39. The method of claim 36, wherein receiving the indication that the media handle has been released further comprises providing viewable access to media files associated with the segment of time in the time bar.

40. The method of claim 32, wherein receiving the indication that the media handle has been deviated includes receiving the indication that the media handle has been deviated in response to receiving a user indication.

41. The method of claim 32, wherein receiving the indication that the media handle has been released includes receiving the indication that the media handle has been released in response to receiving a user indication.

* * * * *